(12) United States Patent
Chappell et al.

(10) Patent No.: US 11,165,252 B2
(45) Date of Patent: Nov. 2, 2021

(54) METHOD AND APPARATUS FOR AUTOMATIC DETECTION AND SELECTION OF POWER OVER ETHERNET AND POWER OVER POWERED DATA LINES

(71) Applicant: CommScope Technologies LLC, Hickory, NC (US)

(72) Inventors: Eric Ryan Chappell, Statesville, NC (US); Morne Erasmus, Richardson, TX (US); David Thomas, Chester (GB)

(73) Assignee: CommScope Technologies LLC, Hickory, NC (US)

( * ) Notice: Subject to any disclaimer, the term of this patent is extended or adjusted under 35 U.S.C. 154(b) by 986 days.

(21) Appl. No.: 15/851,417

(22) Filed: Dec. 21, 2017

(65) Prior Publication Data

US 2018/0191158 A1 Jul. 5, 2018

Related U.S. Application Data

(60) Provisional application No. 62/439,938, filed on Dec. 29, 2016.

(51) Int. Cl.
*H02J 3/02* (2006.01)
*G06F 1/26* (2006.01)
(Continued)

(52) U.S. Cl.
CPC ............... *H02J 3/02* (2013.01); *G06F 1/266* (2013.01); *H01R 24/64* (2013.01); *H04L 12/10* (2013.01);
(Continued)

(58) Field of Classification Search
CPC ........ H02J 3/00; H02J 3/02; H02J 3/38; H02J 3/383; H02J 3/385; H02J 3/386;
(Continued)

(56) References Cited

U.S. PATENT DOCUMENTS

| 7,046,618 B2 * | 5/2006 | Santhoff | ............... H04B 1/7163 |
|  |  |  | 370/205 |
| 9,377,794 B1 * | 6/2016 | Dwelley | ............. H04L 41/0681 |

(Continued)

OTHER PUBLICATIONS

European Patent Office, "Extended European Search Report from EP Application No. 17888324.5", from Foreign Counterpart to U.S. Appl. No. 15/851,417, dated May 13, 2020, pp. 1 through 7, Published: EP.

(Continued)

*Primary Examiner* — Nguyen Tran
*Assistant Examiner* — Jagdeep S Dhillon
(74) *Attorney, Agent, or Firm* — Fogg & Powers LLC

(57) ABSTRACT

In one embodiment, a method for operating a PoE and PoDL hub is provided. The method comprises: ascertaining if an Ethernet connection has been formed with an operating device with the PoE and PoDL hub; if no Ethernet connection has been formed, then sensing whether the operating device is an Ethernet powered device; if the operating device is an Ethernet powered device, then providing power to the operating device; if the operating device is determined not to be an Ethernet powered device, then sensing whether the operating device is a PoDL device; and if the operating device is a PoDL device, then providing power to the operating device.

18 Claims, 5 Drawing Sheets

(51) Int. Cl.
*H01R 24/64* (2011.01)
*H04L 12/10* (2006.01)
*H04L 12/40* (2006.01)
*H01R 107/00* (2006.01)

(52) U.S. Cl.
CPC .... *H04L 12/40045* (2013.01); *H01R 2107/00* (2013.01)

(58) Field of Classification Search
CPC ..... G06F 1/266; H01R 24/64; H01R 2107/00; H04L 12/10; H04L 12/40045
USPC ...................... 307/42, 64, 66, 82, 80, 38, 43
See application file for complete search history.

(56) References Cited

U.S. PATENT DOCUMENTS

| | | | | |
|---|---|---|---|---|
| 10,045,428 | B2* | 8/2018 | Wendt | H02J 3/14 |
| 2008/0238447 | A1* | 10/2008 | de la Torre Vega | H04L 12/10 |
| | | | | 324/676 |
| 2014/0372773 | A1* | 12/2014 | Heath | G06F 1/26 |
| | | | | 713/300 |
| 2015/0019884 | A1* | 1/2015 | Huff | H04L 12/10 |
| | | | | 713/300 |
| 2015/0145324 | A1* | 5/2015 | Heath | H04L 12/40045 |
| | | | | 307/1 |
| 2015/0326403 | A1* | 11/2015 | Dwelley | G01R 31/67 |
| | | | | 713/300 |
| 2016/0054777 | A1* | 2/2016 | Dwelley | G06F 1/3206 |
| | | | | 710/110 |
| 2016/0308683 | A1* | 10/2016 | Pischl | H04L 12/10 |
| 2018/0220237 | A1* | 8/2018 | Tabatabai | H04R 3/02 |

OTHER PUBLICATIONS

International Searching Authority, "International Search Report for PCT Application No. PCT/US2017/068001 dated Apr. 13, 2018", Foreign Counterpart to U.S. Appl. No. 15/851,417, filed Apr. 13, 2018, pp. 1-15, Published in: WO.

European Patent Office, "Communication pursuant to Article 94(3) EPC from EP Application No. 17888324.5", from Foreign Counterpart to U.S. Appl. No. 15/851,417, dated Apr. 6, 2021, pp. 1 through 4, Published: EP.

* cited by examiner

METHOD AND APPARATUS FOR AUTOMATIC DETECTION AND SELECTION OF POWER OVER ETHERNET AND POWER OVER POWERED DATA LINES

CROSS-REFERENCE TO RELATED APPLICATIONS

This is a non-provisional application that claims the benefit of U.S. Provisional Patent Application Ser. No. 62/439,938, filed on Dec. 29, 2016, which is hereby incorporated herein by reference in its entirety.

BACKGROUND

Power over Ethernet (PoE) is ubiquitously used to provide data connectivity and power to between networked devices. PoE systems are typically implemented pursuant to IEEE802.3af and IEEE802.3at standards. Ethernet connectivity requires the use of four pairs of wires. Ethernet provides power over two wire pairs using transformer isolation.

There is a demand to provide data communications and power over relatively short distances for applications such as automotive electronics and the Internet of Things (IoT). This can be accomplished effectively and more cost efficiently using cabling having a pair of wires rather than multiple pairs of wires as is used in Ethernet cabling.

Therefore, Power over Data Lines (PoDL) has been proposed to utilize just one wire pair for communications and power provision. Standards for PoDL are being developed through a IEEE802.3bu standard. PoDL and PoE use different, incompatible techniques to supply and deliver power. PoE utilizes transformer isolation to separate power provision and delivery from the Ethernet transceivers. PoDL uses capacitive isolation to separate power provision and delivery from the PoDL transceivers.

SUMMARY OF THE INVENTION

In one embodiment, a method for operating a PoE and PoDL hub is provided. The method comprises: ascertaining if an Ethernet connection has been formed with an operating device with the PoE and PoDL hub; if no Ethernet connection has been formed, then sensing whether the operating device is an Ethernet powered device; if the operating device is an Ethernet powered device, then providing power to the operating device; if the operating device is determined not to be an Ethernet powered device, then sensing whether the operating device is a PoDL device; and if the operating device is a PoDL device, then providing power to the operating device.

DRAWINGS

DETAILED DESCRIPTION

Figure 1:
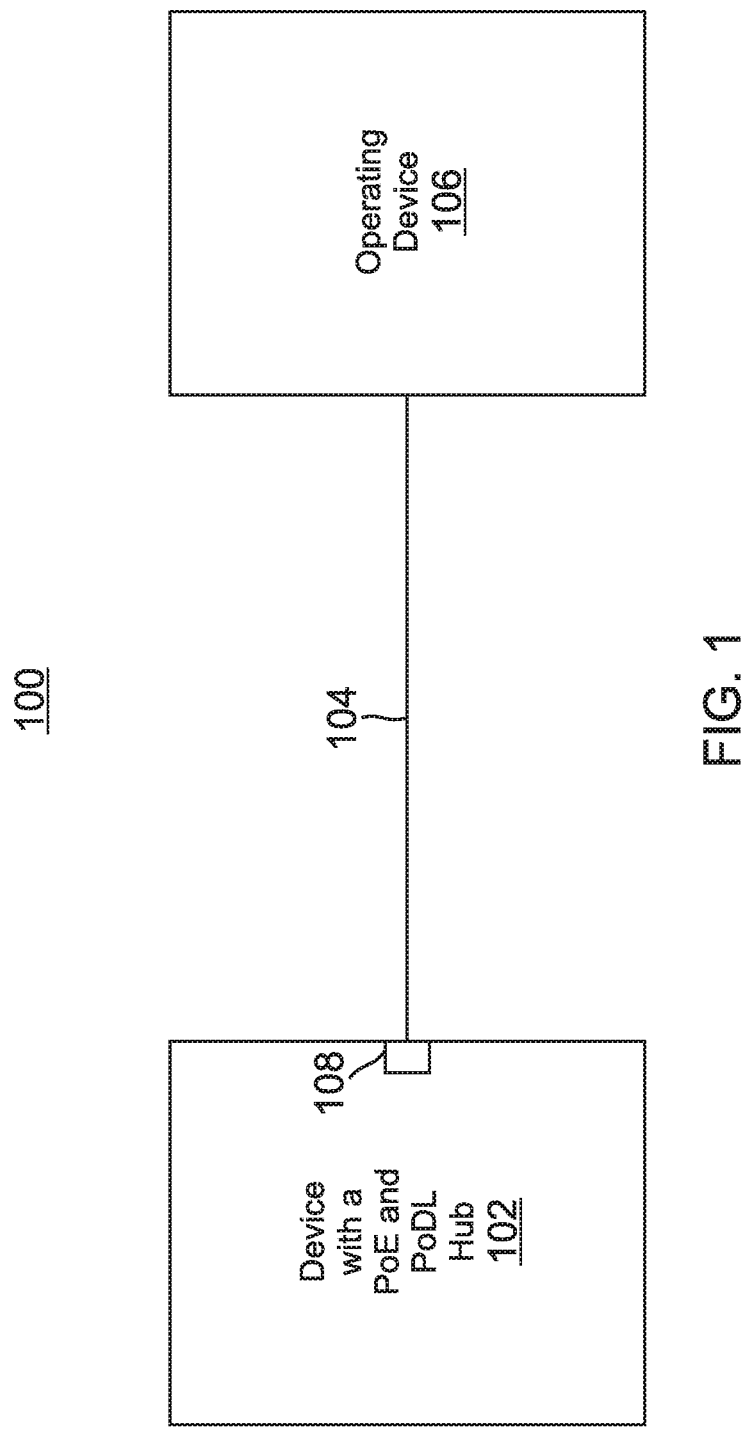
FIG. 1 illustrates a block diagram of an exemplary network with a device with a PoE and PoDL hub coupled to an operating device by a cable.

FIG. 1 illustrates a block diagram of an exemplary network 100 with a device with a PoE and PoDL hub 102 coupled to an operating device 106 by a cable 104. In one embodiment, the device with a PoE and PoDL hub 102 is a gateway, and the operating device 106 is a sensor, actuator, or camera device. It is to be understood, however, that the hub 102 and operating device 106 can be implemented in many different types of devices and in many different application areas (for example, vehicle applications, industrial applications, home automation applications as well as more traditional information technology applications such as office and data center communication and computing applications).

The operating device 106 utilizes either Ethernet or PoDL communication protocols. The device with a PoE and PoDL hub 102 has a connector 108, such as a jack or a port, which is configured to receive a connector, such as a plug, common to both Ethernet and PoDL. In one embodiment, the jack and plug are respectively a RJ-45 type jack and a RJ-45 type plug. Once coupled to the operating device 106, the device with a PoE and PoDL hub 102 must ascertain whether it has been coupled to an operating device 106 that communicates using Ethernet or PoDL protocols.

Figure 2A:
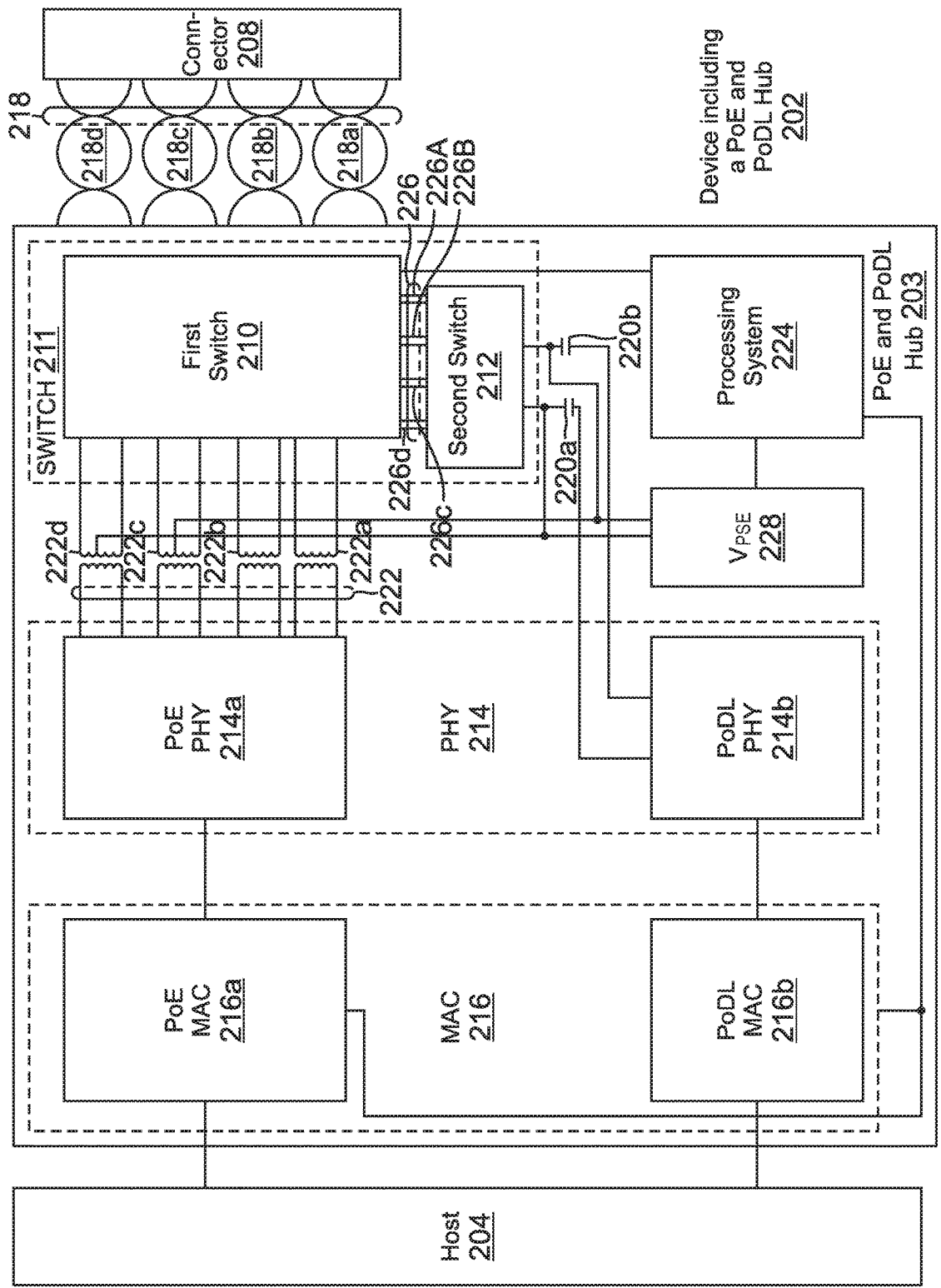
FIG. 2A illustrates an exemplary device with a PoE and PoDL hub.

FIG. 2A illustrates an exemplary device including a PoE and PoDL hub 202. The device including a PoE and PoDL hub 202 comprises a host 204, and a PoE and PoDL hub 203 coupled by of conductors 218, e.g., wires, to a connector 208. In another embodiment, the conductors 218 comprise a first pair of conductors 218a, a second pair of conductors 218b, a third pair of conductors 218c, and a fourth pair of conductors 218d required for Ethernet connectivity, and which would facilitate PoDL connectivity. In a further embodiment, the connector 208 may be a RJ-45 type connector, e.g., a RJ-45 type jack.

The host 204 is coupled to the PoE and PoDL hub 203. In one embodiment, the host 204 is a processing system that facilitates communications by the device including a PoE and PoDL hub 202, e.g. with an operating device 106. In another embodiment, the host 204 may provide other services, e.g. such as controlling the operation of the device including a PoE and PoDL hub 202, which may be a gateway, network switch or router. In a further embodiment, the host 204 may perform both of the foregoing sets of functions.

In one embodiment, the PoE and PoDL hub 203 comprises a first switch 210, second switch 212, PoE transceiver (PoE PHY) 214a, PoE media access controller (PoE MAC) 216a, PoDL transceiver (PoDL PHY) 214b, PoDL media access controller (PoDL MAC) 216b, power sourcing equipment ($V_{PSE}$) 228, a first capacitor 220a, a second capacitor 220b, transformers 222, pairs of switch conductors 226, and a processing system 224.

In one embodiment, the PoE PHY 214a and the PoDL PHY 214b are co-fabricated as a single transceiver (PHY) 214, e.g. on one integrated circuit. In another embodiment, the PoE PHY 214a and the PoDL PHY 214b are fabricated as separate transceivers, e.g. as separate integrated circuits.

In one embodiment, the PoE MAC 216a and the PoDL MAC 216b are co-fabricated as a single media access controller (MAC) 216, e.g. on one integrated circuit. In another embodiment, the PoE MAC 216a and the PoDL MAC 216b are fabricated as separate media access controllers, e.g. on separate integrated circuits.

In one embodiment, the PoE PHY 214a and the PoE MAC 216a are co-fabricated as a single PoE MAC and PHY, e.g.

on one integrated circuit. In another embodiment, the PoE PHY 214a and the PoE MAC 216a are fabricated separately, e.g. on separate integrated circuits.

In one embodiment, the PoDL PHY 214b and the PoDL MAC 216b are co-fabricated as a single PoDL MAC and PHY, e.g. on one integrated circuit. In another embodiment, the PoDL PHY 214b and the PoDL MAC 216b are fabricated separately, e.g. on separate integrated circuit.

In one embodiment, the PoE PHY 214a, the PoDL PHY 214b, the PoE MAC 216a and the PoDL MAC 216b are co-fabricated as a single PoE-PoDL MAC and PHY, e.g. on one integrated circuit. In another embodiment, the PoE PHY 214a, the PoDL PHY 214b, the PoE MAC 216a and the PoDL MAC 216b are each fabricated separately, e.g. each on separate integrated circuits.

The connector 208 is coupled to the PoE and PoDL hub 203, e.g. to the first switch 210, through the conductors 218. The host 204 is coupled to the PoE and PoDL hub 203, e.g. to the PoE MAC 216a and the PoDL MAC 216b.

The first switch 210 is coupled to the second switch 212 by the pairs of switch conductors 226. In one embodiment, the pairs of switch conductors 216 comprise a first switch conductor pair 226a, a second switch conductor pair 226b, a third switch conductor pair 226c, and a fourth switch conductor pair 226a. Each of such switch conductor pair corresponds respectively to a pair of conductors that couple the first switch 210 to the connector 208. In one embodiment, the functionality of the first switch 210 and the second switch 210 can be integrated a single switch 211.

The first switch 210 is coupled to the PoE PHY 214a by transformers 222. In one embodiment, the transformers 222 comprise a first transformer 222a, a second transformer 222b, a third transformer 222c, and a fourth transformer 222a. Each of such transformers 222 corresponds respectively to a pair of conductors that couple the first switch 210 to the connector 208. Each transformer has a first winding and a second winding.

Figure 2B:
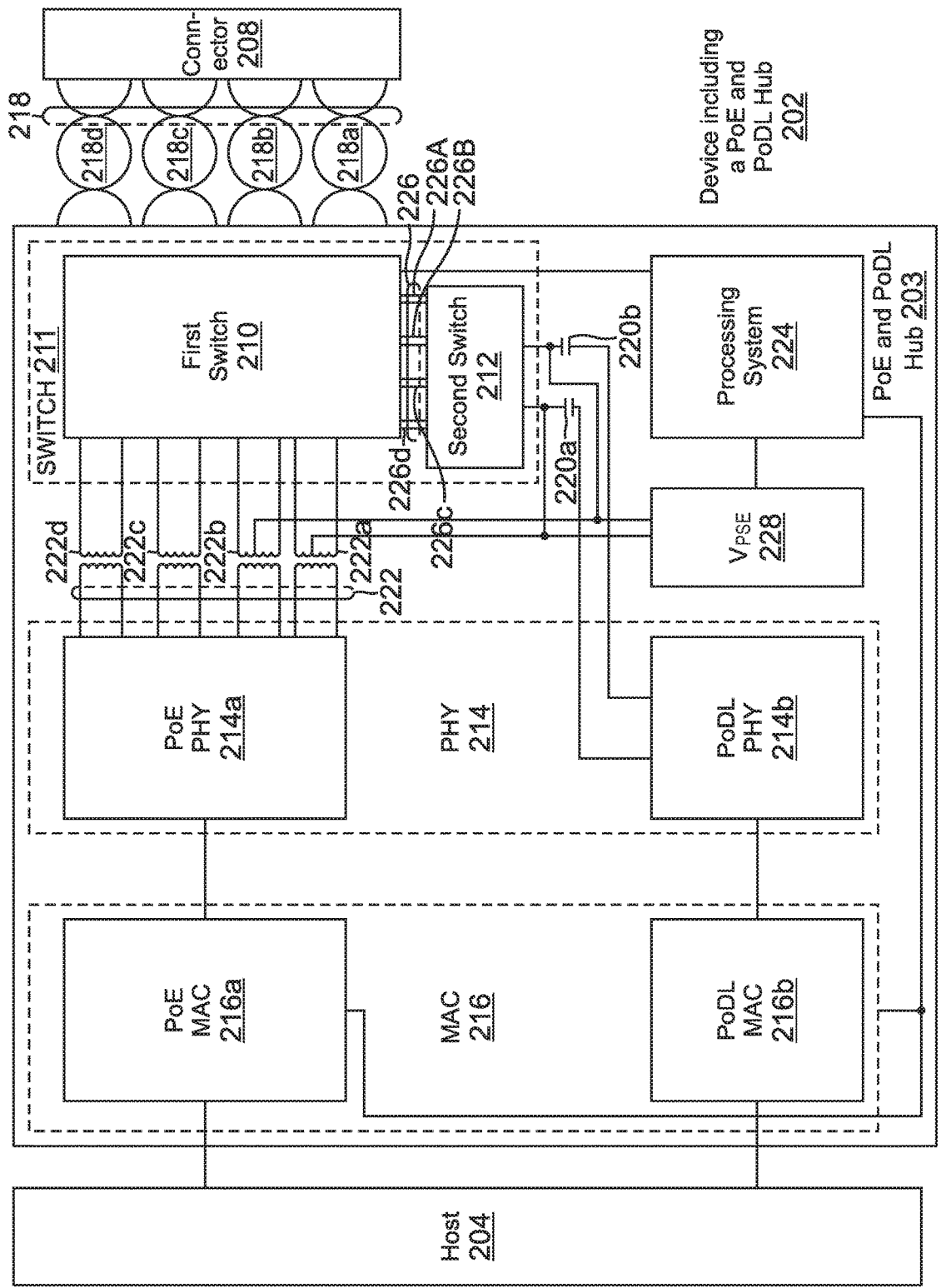
FIG. 2B illustrates another exemplary device with a PoE and PoDL hub.
Figure 2C:
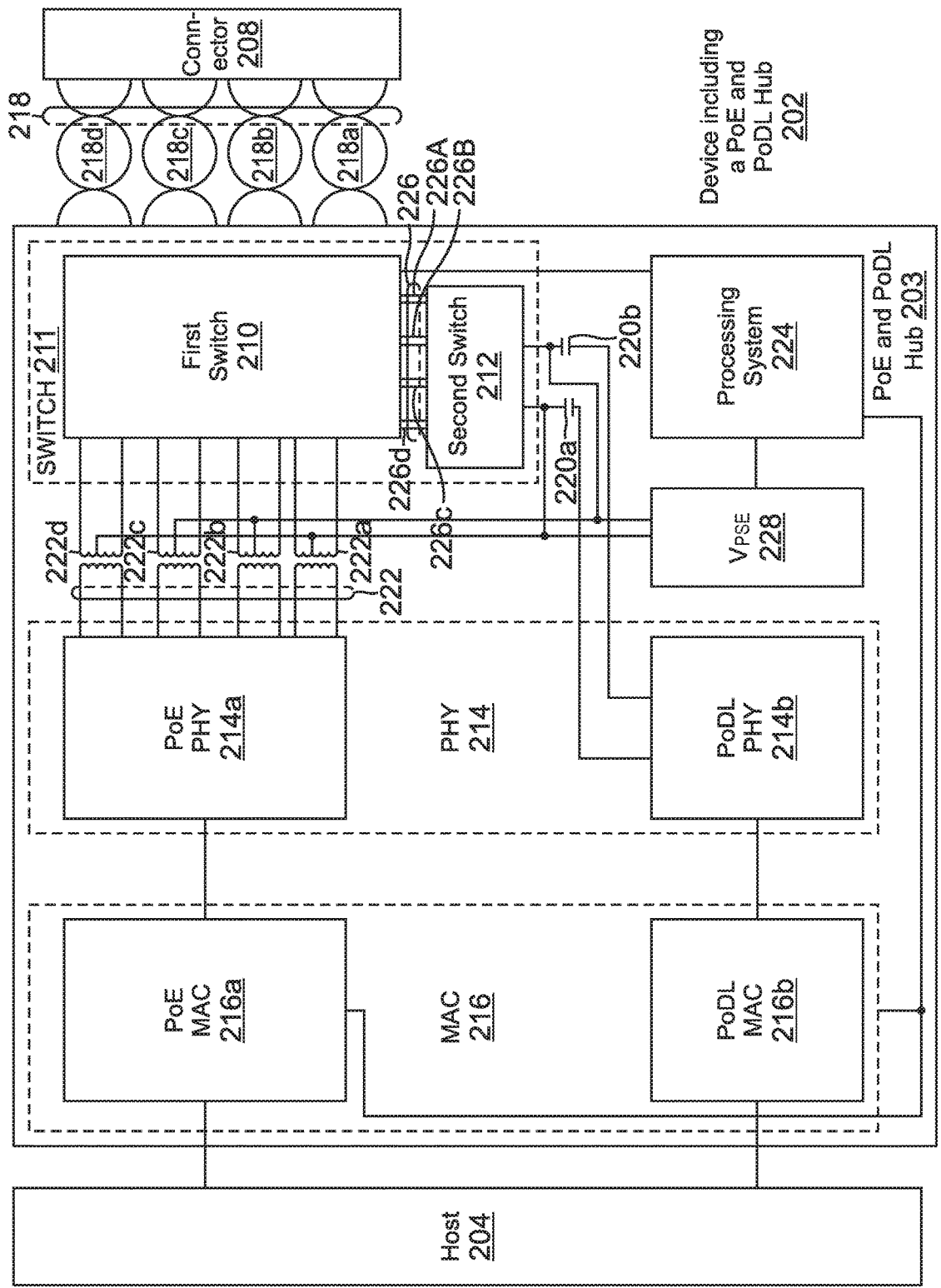
FIG. 2C illustrates yet another exemplary device with a PoE and a PoDL hub.

In one embodiment, illustrated in FIG. 2A, the power sourcing equipment 228 is coupled to, e.g. center taps, of windings of each of the third transformer 222c and the fourth transformer 222d that are immediately coupled to the first switch 210. FIG. 2B illustrates another exemplary device with a PoE and PoDL hub. In this alternative embodiment, the power sourcing equipment 228 is coupled to, e.g. the center taps, windings of the first transformer 222a and the second transformer 222b that are immediately coupled to the first switch 210. FIG. 2C illustrates yet another exemplary device with a PoE and a PoDL hub. In this alternative embodiment, the power sourcing equipment 228 is coupled to, e.g. to the center taps, windings of the first transformer 222a and fourth transformer 222d that are immediately coupled to the first switch 210, and the second transformer 222b and the third transformer 222c that are immediately coupled to the first switch 210.

Proposed IEEE standard 802.3bt contemplates using four pairs of conductors to supply higher power to Ethernet powered devices. In one embodiment, the power sourcing equipment 228 can be coupled to the windings, e.g. center taps, of two pairs of transformers. Thus, in another embodiment, the power sourcing equipment 228 is coupled to windings of each of the first transformer 222a and the fourth transformer 222d, and the windings of the second transformer 222b and the third transformer 222c. In a further embodiment, the power sourcing equipment 228 can be coupled to the windings of each of the first transformer 222a and the second transformer 222b, and the windings of the third transformer 222c and the fourth transformer 222d. In yet another embodiment, the power sourcing equipment 228 includes at least two power supplies each of which provides power to two pairs of conductors; the voltage and current levels provided to each set of two pairs of conductors can be independently controlled by the power supplies coupled to the set of two pairs of conductors.

In one embodiment, the processing system 224 is coupled to the first switch 210, the second switch 212, and the power sourcing equipment. In another embodiment, processing equipment is coupled to the PoE MAC 216a, and the PoDL MAC 216b. The processing system 224 commands the first switch 210 and the second switch 212, and receives feedback from the PoE MAC 216a and the PoDL MAC 216b.

In one embodiment, the processing system 224 is implemented with a processor, and electronic sensor(s). The electronic sensor(s) are used to verify whether the operating device is an Ethernet powered device or a PoDL device, as is further described below.

In one embodiment, the processor is a state machine, microcontroller or central processing unit. In another embodiment, the processing system 224 may include memory. In a further embodiment, the processor may be located in the host, rather than the processing system 224.

In one embodiment, the power sourcing equipment 228 is coupled to the processing system 224. In another embodiment, the processing system 224 activates and deactivates the power sourcing equipment 228; the processing system 224 may turn 'ON' and 'OFF' the power sourcing equipment 228, or place the power sourcing equipment 228 in a 'SLEEP' and 'AWAKE' modes. In a further embodiment, the processing system 224 adjusts the voltage and/or current provided by the power sourcing equipment 228. In yet another embodiment, the host 204 activates and deactivates the power sourcing equipment 228, and adjusts the voltage and/or current provided by the power sourcing equipment 228.

The PoE PHY 214a and PoDL PHY 214b are coupled respectively to the PoE MAC 216a and the PoDL MAC 216b. The PoE MAC 216a and the PoDL MAC 216b are each coupled to the host 204. The PoDL PHY 214b has two terminals coupled to two terminals of the second switch 212 through a first capacitor 220a and a second capacitor 220b. The power sourcing equipment 228 is also coupled to the same two terminals of the second switch 212.

In one embodiment, the PHY 214 is coupled to the MAC 216. In this embodiment, the MAC 216 is coupled to the host 204, and the PHY 214 has two terminals coupled to two terminals of the second switch 212 through a first capacitor 220a and a second capacitor 220b.

In one embodiment, the first switch 210 is a switch matrix. In another embodiment, the second switch 212 is a double pole four throw (DP4T) switch.

Figure 3:
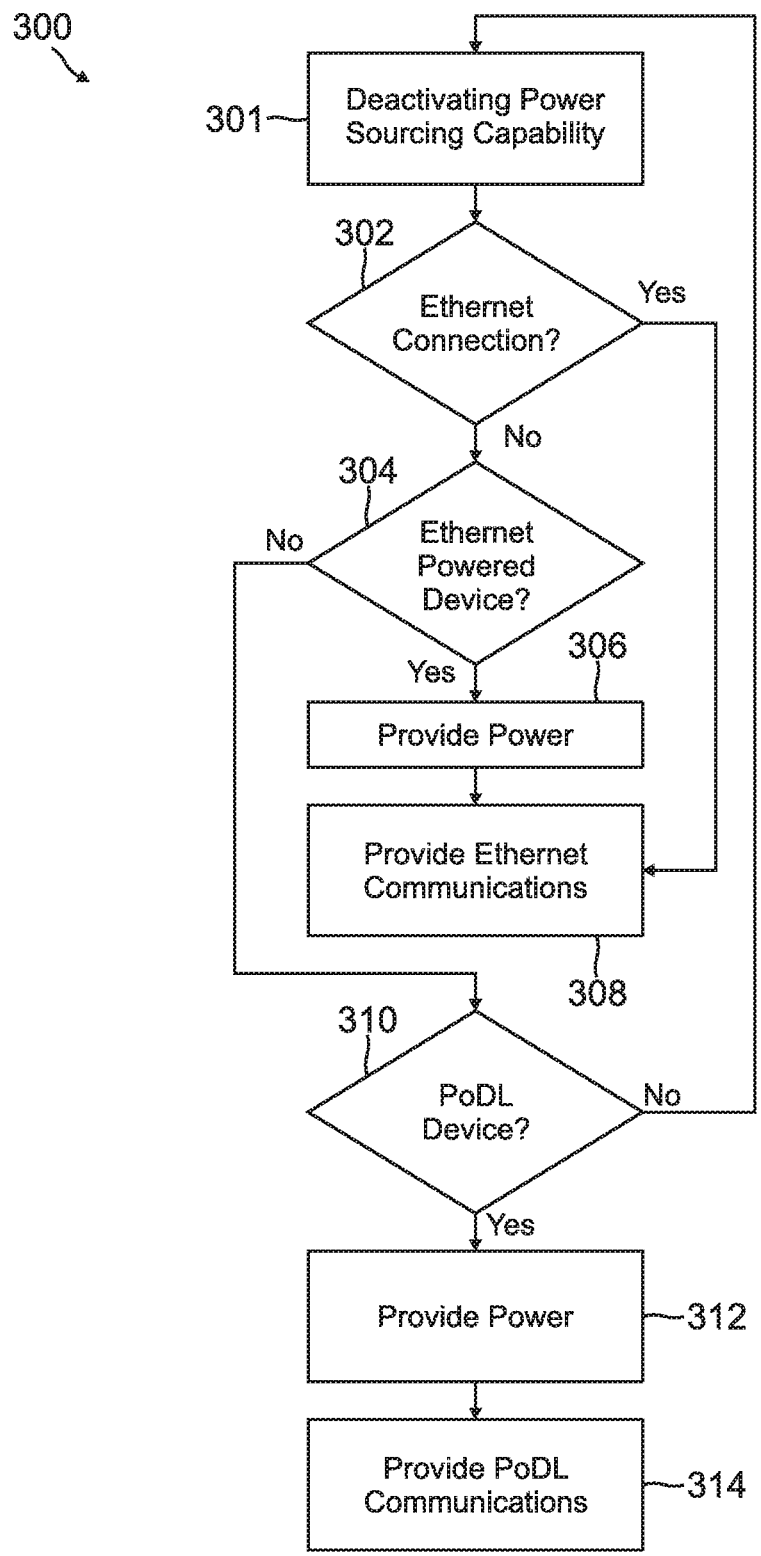
FIG. 3 illustrates one embodiment of operation of the exemplary device with a PoE and PoDL hub.

FIG. 3 illustrates one embodiment of operation of the exemplary device with a PoE and PoDL hub. The embodiment of method 300 shown in FIG. 3 is described here as being implemented in the system shown in FIGS. 2A-2C, though it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In one embodiment, in block 301, the power sourcing capability, e.g. the power sourcing equipment 228, of the PoE and PoDL hub 202 is de-activated, or such de-activation is maintained. Then, in block 302, the PoE and PoDL hub 202 ascertains if an Ethernet connection has been formed with the operating device 106 including the PoE and PoDL hub 202. In one embodiment, the processing system 224 commands the first switch 210 to connect the first pair of conductors 218a, the second pair of conductors 218b, the third pair of conductors 218c, and the fourth pair of conductors 218d respectively to the first transformer 222a, the second transformer 222b, the third transformer 222c, and the fourth transformer 222d. The PoE PHY 214a transmits and/or receives data between the host 204 and/or the PoE MAC 216, and the operating device 106. The PoE MAC 216 and/or the host 204 detect whether an Ethernet connection is formed between the device with the PoE and PoDL hub 102 and the operating device 106. If an Ethernet connection is detected, then proceed to block 308. If no Ethernet connection is detected, then proceed to block 304.

In block 304, sense whether the operating device 106 is an Ethernet powered device. In one embodiment, this is performed by having the device with a PoE and PoDL hub 102 sense if a twenty-five-thousand-ohm resistor is bridged across at least one of pair of conductors at the operating device 106. In another embodiment, the processing system 224 is configured to perform such sensing.

If the operating device 106 is determined to be an Ethernet powered device, then, in block 306, provide power to operating device 106, e.g. by activating the power sourcing equipment 228. In one embodiment, if the operating device 106 is determined to be an Ethernet powered device, then prior to providing power to the operating device 106, detect the PoE power device class, e.g. 0 through 4, of the operating device 106. Then provide, e.g. from the power sourcing equipment 228, the voltage and current corresponding to the detected PoE power device class. If the operating device 106 is not determined to be an Ethernet powered device, proceed to block 310. After providing power, then in block 308, provide Ethernet communications between the device with the PoE and PoDL hub 108 and the operating device 106. In another embodiment, the PoE MAC 216a and the PoE PHY 214a facilitate Ethernet communications to and from the device including a PoE and PoDL hub 202.

In block 310, determine if the operating device 106 is a PoDL device. In one embodiment, this entails analyzing each of the first pair of conductors 218a, the second pair of conductors 218b, the third pair of conductors 218c, and the fourth pair of conductors 218d to detect or sense whether the operating device 106 is a PoDL device, e.g. by checking for a 4V Zener diode with a 10ma current draw across one of the pair of conductors. In another embodiment, the processing system 224 commands the first switch 210 to connect the first pair of conductors 218a, the second pair of conductors 218b, the third pair of conductors 218c, and the fourth pair of conductors 218d respectively to the first switch conductor pair 226a, the second switch conductor pair 226b, the third switch conductor pair 226c, and the fourth switch conductor pair 226a. The second switch 212 then cycles through each switch conductor pair if and until a PoDL device is detected on one of the switch conductor pairs. In a further embodiment, the switching operation of the second switch 212 is controlled by the processing system 224. In yet another embodiment, such sensing is performed by the processing system 224.

In one embodiment, if no PoDL device is detected, then return to either blocks 301 or 302. If a PoDL device is detected, then in block 312 provide power to the operating device 106, i.e. over the pair of conductors across which the PoDL device was detected. In another embodiment, prior to providing power, communicate with the operating device 106, e.g. over the pair of conductors across which the PoDL device was detected, to determine the power requirements of the operating device 106. Then provide, e.g. from the power sourcing equipment 228, the voltage and current corresponding to the power requirements of the operating device 106.

Next, in block 314, provide PoDL communications between the device with the PoE and PoDL hub 108 and the operating device 106. In another embodiment, the PoDL MAC 216b and the PoDL PHY 214b facilitate Ethernet communications to and from the device including a PoE and PoDL hub 202.

EXAMPLE EMBODIMENTS

Example 1 includes a Power over Ethernet (PoE) and Power over Data Lines (PoDL) hub, comprising: a PoE media access controller configured to be coupled to a host; a PoE transceiver coupled to the PoE media access controller; a PoDL media access controller configured to be coupled to the host; a PoDL transceiver coupled to the PoDL media access controller; at least two transformers each having a first winding and second winding; wherein first windings are coupled to the PoE transceiver; at least one switch coupled to second windings and configured to be coupled to a connector; a first capacitor and a second capacitor which couple the PoDL transceiver to the at least one switch; power sourcing equipment coupled to the at least one switch and at least one pair of the second windings; and a processing system coupled to the at least one switch and the power sourcing equipment.

Example 2 includes the hub of Example 1, wherein the processing system is further coupled to the PoE media access controller and the PoDL media access controller.

Example 3 includes the hub of any of Examples 1-2, wherein the processing system is configured to sense whether an operating device coupled to the connector is either an Ethernet powered device or a PoDL device.

Example 4 includes the hub of any of Examples 1-3, wherein the at least one switch comprises a first switch coupled to the second windings of at least two transformers; at least two pairs of switch conductors coupled to the first switch; and a second switch coupled to the at least two pairs of switch conductors, the first and second capacitors, and the power sourcing equipment.

Example 5 includes the hub of any of Examples 1-4, wherein a PoE media access controller and the PoDL media access controller are integrated into a single media access controller.

Example 6 includes the hub of any of Examples 1-5, wherein a PoE transceiver and the PoDL transceiver are integrated into a single transceiver.

Example 7 includes a method of operating a PoE and PoDL hub, comprising: ascertaining if an Ethernet connection has been formed with to an operating device with the PoE and PoDL hub; if no Ethernet connection has been formed, then sensing whether the operating device is an Ethernet powered device; if the operating device is an Ethernet powered device, then providing power to the operating device; if the operating device is determined not to be an Ethernet powered device, then sensing whether the operating device is a PoDL device; and if the operating device is a PoDL device, then providing power to the operating device.

Example 8 includes the method of Example 7, further comprising deactivating a power sourcing capability.

Example 9 includes the method of any of Examples 7-8, further comprising if either an Ethernet connection has been made to the operating device or power has been provided to the operating device that is an Ethernet powered device, then provide Ethernet communications.

Example 10 includes the method of any of Examples 7-9, further comprising if power is provided to the PoDL device then provide PoDL communications.

Example 11 includes the method of any of Examples 7-10, wherein providing power to the operating device that is an Ethernet powered device further comprises: detecting a PoE power device class of the operating device; and providing the voltage and current from the power sourcing equipment to the operating device corresponding to the detected PoE power device class.

Example 12 includes the method of any of Examples 7-11, wherein providing power to the operating device that is a PoDL device comprises: communicating with the operating device to determine the power requirements of the operating device; and providing the voltage and current from the power sourcing equipment corresponding to the power requirements of the operating device.

Example 13 includes a device including a Power over Ethernet (PoE) and Power over Data Lines (PoDL) hub, comprising: a PoE and PoDL hub; conductors coupled to the PoE and PoDL hub; a connector coupled to the conductors; and a host coupled to the PoE and PoDL hub.

Example 14 includes the device of Example 13, wherein the PoE and PoDL hub comprises: a PoE media access controller configured to be coupled to a host; a PoE transceiver coupled to the PoE media access controller; a PoDL media access controller configured to be coupled to the host; a PoDL transceiver coupled to the PoDL media access controller; at least two transformers each having a first winding and second winding; wherein first windings are coupled to the PoE transceiver; at least one switch coupled to second windings and configured to be coupled to a connector; a first capacitor and a second capacitor which couple the PoDL transceiver to the at least one switch; power sourcing equipment coupled to the at least one switch and at least one pair of the second windings; and a processing system coupled to the at least one switch and the power sourcing equipment.

Example 15 includes the device of Example 14, wherein the processing system is further coupled to the PoE media access controller and the PoDL media access controller.

Example 16 includes the device of Example 15, wherein the processing system is configured to sense whether an operating device coupled to the connector is either an Ethernet powered device or a PoDL device.

Example 17 includes the device of any of Examples 14-16, wherein the at least one switch comprises a first switch coupled to the second windings of at least two transformers; at least two pairs of switch conductors coupled to the first switch; and a second switch coupled to the at least two pairs of switch conductors, the first and second capacitors, and the power sourcing equipment.

Example 18 includes the device of any of Examples 14-17, wherein a PoE media access controller and the PoDL media access controller are integrated into a single media access controller.

Example 19 includes the device of Example 14-18, wherein a PoE transceiver and the PoDL transceiver are integrated into a single transceiver.

Example 20 includes the device of any of Examples 13-19, wherein the connector is a RJ-45 type connector.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. For example, a signal may be a voltage signal or a current signal.

What follows are exemplary claims. The claims are not intended to be exhaustive or limiting. The applicant reserves the right to introduce other claims directed to subject matter enabled by this application.

The invention claimed is:

1. A Power over Ethernet (PoE) and Power over Data Lines (PoDL) hub, comprising:
   a PoE media access controller configured to be coupled to a host;
   a PoE transceiver coupled to the PoE media access controller;
   a PoDL media access controller configured to be coupled to the host;
   a PoDL transceiver coupled to the PoDL media access controller;
   at least two transformers each having a first winding and a second winding;
   wherein each first winding is coupled to the PoE transceiver;
   at least one switch coupled to each second winding and configured to be coupled to a connector;
   a first capacitor and a second capacitor which couple the PoDL transceiver to the at least one switch;
   power sourcing equipment coupled to the at least one switch and at least one pair of second windings; and
   processing circuitry coupled to the at least one switch and the power sourcing equipment;
   wherein the processing circuitry is configured to:
      sense whether an operating device coupled to the connector is a device configured to be powered by a first power delivery means;
      if the operating device is not configured to be powered by the first power delivery means, then sense whether the operating device is a device configured to be powered by a second power delivery means; and
      upon determining that the operating device is a device configured to be powered by either the first or second power delivery means, then cause the power sourcing equipment to provide power, through the at least one switch, to the operating device, wherein the first power delivery means is PoE or PoDL, and the second power delivery means is respectively PoDL or PoE.

2. The hub of claim 1, wherein the processing circuitry is further coupled to the PoE media access controller and the PoDL media access controller.

3. The hub of claim 1, wherein the processing circuitry is further configured to:
   upon determining that either an Ethernet connection has been made to the operating device or power has been provided by PoE to the operating device, then provide Ethernet communications between the host and the operating device; and upon determining that power is provided by PoDL to the operating device, then provide PoDL communications.

4. The hub of claim 1, wherein the at least one switch comprises a first switch coupled to second windings of at least two transformers;
at least two pairs of switch conductors coupled to the first switch; and
a second switch coupled to the at least two pairs of switch conductors, the first and second capacitors, and the power sourcing equipment.

5. The hub of claim 1, wherein a PoE media access controller and the PoDL media access controller are integrated into a single media access controller.

6. The hub of claim 1, wherein a PoE transceiver and the PoDL transceiver are integrated into a single transceiver.

7. A method of operating a PoE and PoDL hub, comprising:
ascertaining if an Ethernet connection has been formed between an operating device and the PoE and PoDL hub;
if no Ethernet connection has been formed, then sensing whether the operating device is powered by a first power delivery means;
if the operating device is powered by the first power delivery means, then providing power to the operating device by the first power delivery means;
if the operating device is determined not to be powered by the first power delivery means, then sensing whether the operating device is powered by a second power delivery means; and
if the operating device is powered by the second power delivery means, then providing power to the operating device by the second power delivery means, wherein the first power delivery means is PoE or PoDL, and the second power delivery means is respectively PoDL or PoE.

8. The method of claim 7, further comprising deactivating a power sourcing capability.

9. The method of claim 7, further comprising if either an Ethernet connection has been made to the operating device or power has been provided to the operating device that is powered by PoE, then provide Ethernet communications.

10. The method of claim 7, further comprising if power is provided to the operating device powered by PoDL, then provide PoDL communications.

11. The method of claim 7, wherein providing power to the operating device powered by PoE further comprises:
detecting a class of the operating device; and
providing a voltage and a current to the operating device corresponding to the detected class.

12. The method of claim 7, wherein providing power to the operating device by PoDL comprises:
communicating with the operating device to determine power requirements of the operating device; and
providing a voltage and a current corresponding to the power requirements of the operating device.

13. A Power over Ethernet (PoE) and Power over Data Lines (PoDL) hub, comprising:
a media access controller configured to be coupled to a host;
a transceiver configured to communicate data to and from the media access controller;
power sourcing equipment; and
processing circuitry configured to:
sense whether an operating device coupled to the PoE and PoDL hub is a device configured to be powered by a first power delivery means,
if the operating device is not configured to be powered by the first power delivery means, then sense whether the operating device is a device configured to be powered by a second power delivery means; and
upon determining that the operating device is a device configured to be powered by either the first or second power delivery means, then cause the power sourcing equipment to provide power to the operating device, wherein the first power delivery means is PoE or PoDL, and the second power delivery means is respectively PoDL or PoE.

14. The hub of claim 13, wherein the processing circuitry is further configured to
at least one of: activate and deactivate the power sourcing equipment.

15. The hub of claim 13, wherein the processing circuitry is coupled to the media access controller.

16. The hub of claim 13, wherein the processing circuitry is further configured to cause Ethernet communications between a host and the operating device through the media access controller and the transceiver.

17. The hub of claim 13, wherein the processing circuitry is further configured to detect a class of the operating device;
wherein providing power to the operating device comprises provide a voltage and a current from the power sourcing equipment to the operating device corresponding to the detected class.

18. The hub of claim 13, wherein the processing circuitry is configured to:
determine power requirements of the operating device; and
cause the power sourcing equipment to provide a voltage and a current corresponding to the power requirements of the operating device.

* * * * *